Patented Apr. 29, 1930

1,756,247

UNITED STATES PATENT OFFICE

THOMAS GRISWOLD, JR., AND RALPH M. HUNTER, OF MIDLAND, MICHIGAN, ASSIGNORS TO THE DOW CHEMICAL COMPANY, OF MIDLAND, MICHIGAN, A CORPORATION OF MICHIGAN

MAKING MAGNESIUM CHLORIDE FROM CHLORINE AND A MAGNESIUM BASE

Application filed July 2, 1928. Serial No. 289,673.

The present invention is concerned with the production of magnesium chloride. This salt has an important use in the production of magnesium metal by electrolysis of a fused bath thereof with the simultaneous production of chlorine gas, which, owing to high temperature and other operating conditions, is usually greatly diluted with air and not readily usable for most purposes for which chlorine is customarily employed.

Our invention concerns specifically a process for making magnesium chloride for use in the manufacture of magnesium metal by electrolysis. As a source of raw material to be converted in our process to magnesium chloride, we may use magnesium hydroxide which can be obtained for instance as a by-product in the treatment of brines containing magnesium chloride and other salts, or we may use calcined magnesia, magnesium carbonate, or other base reactable under the disclosed conditions. This process is further distinguished by the cycling of the chlorine produced and the coincident production of Epsom salts.

To the accomplishment of the foregoing and related ends, the invention, then, consists of the steps hereinafter fully described and particularly pointed out in the claims, the annexed drawings and the following description setting forth in detail several modes of carrying out the invention, such disclosed modes illustrating, however, but several of the various ways in which the principle of the invention may be used.

Figure 1:
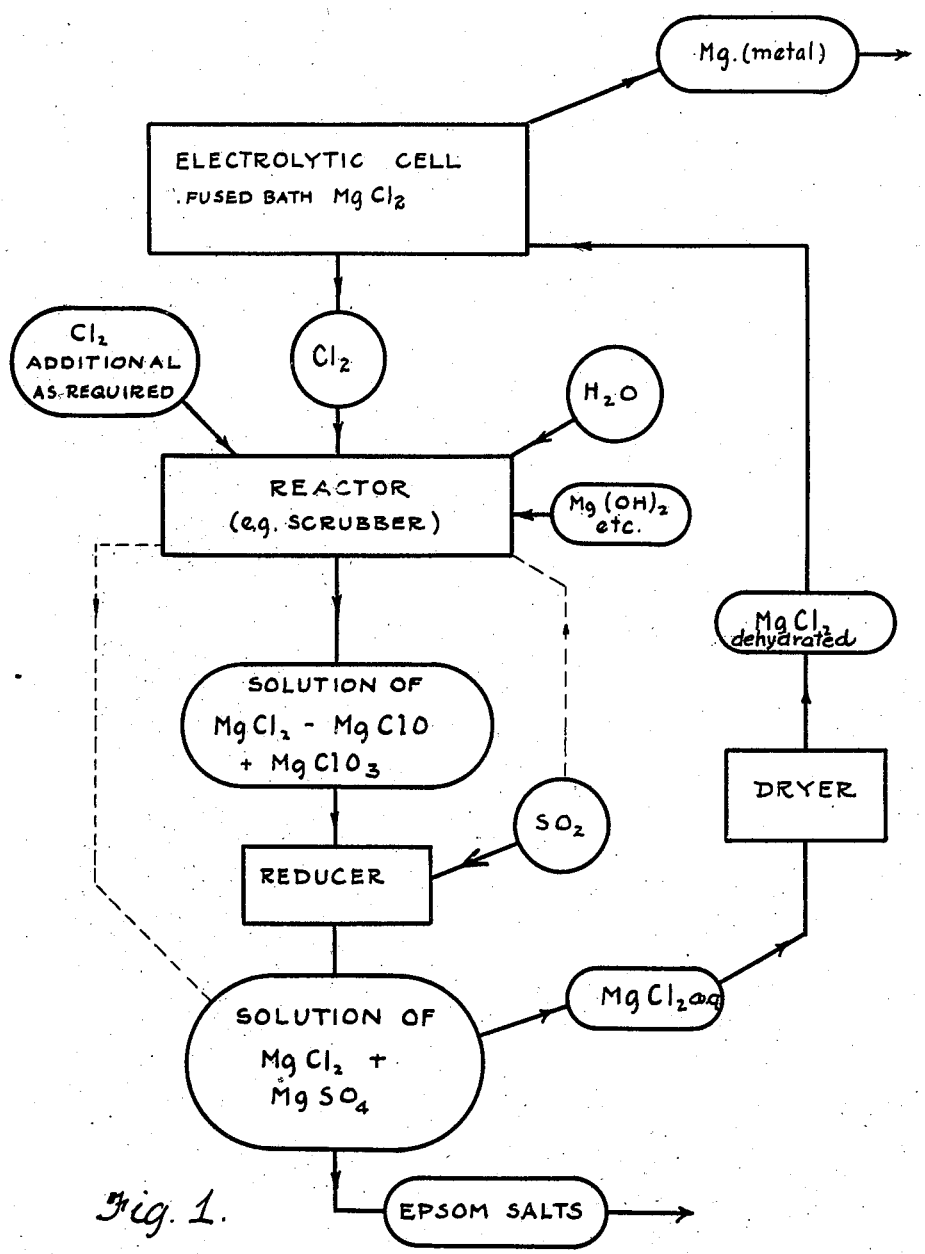
Figure 2:
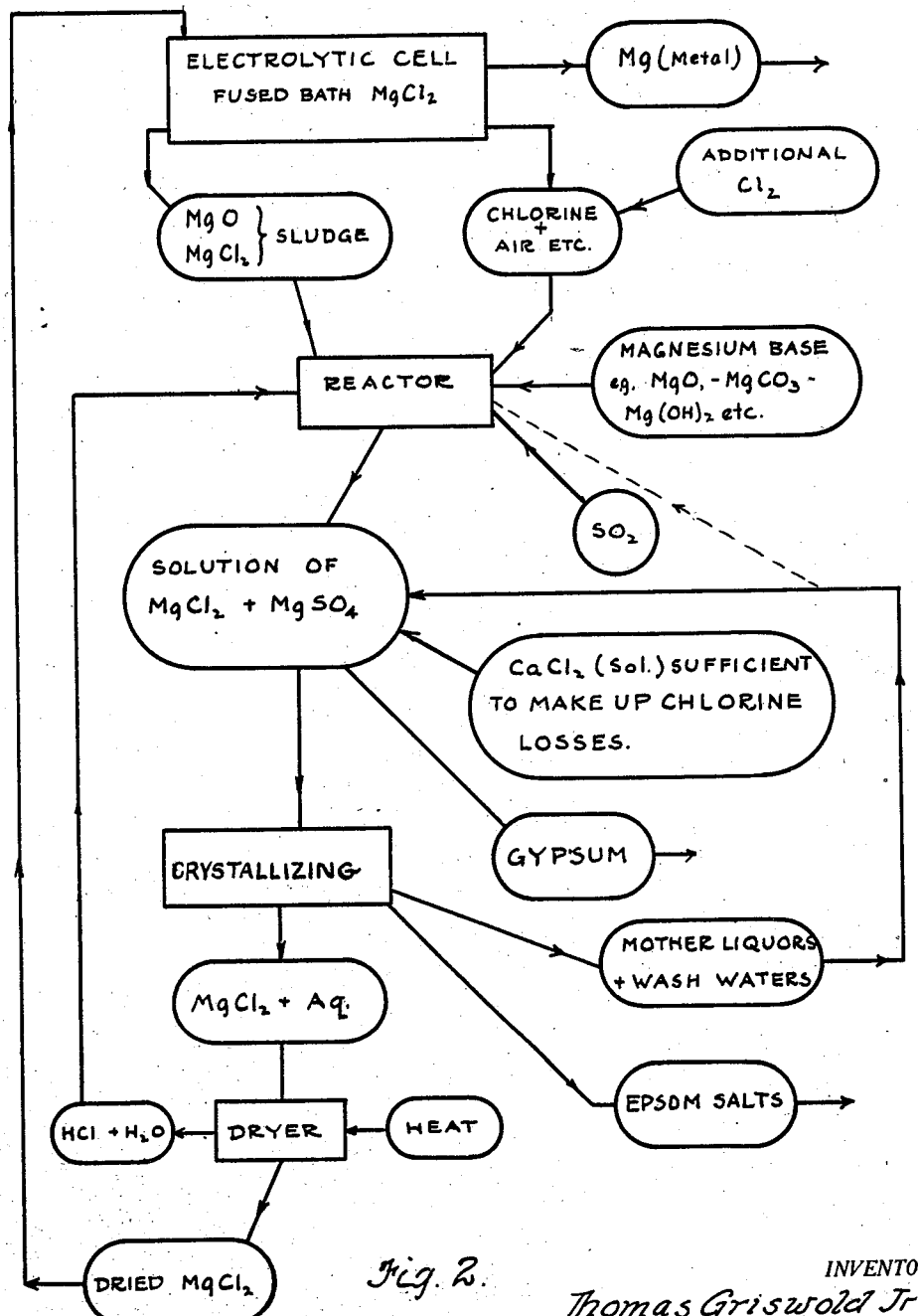

In said annexed drawings:

Figs. 1 and 2, illustrate in the form of diagrams, or flow sheets, two methods, respectively, for carrying out our improved process.

Thus, Fig. 1 of such drawings illustrates in a diagrammatic manner a simple embodiment of the cyclic process herein disclosed, from which it will be seen that once the process is in operation, magnesium chloride is electrolyzed with the production of magnesium metal and chlorine gas. The chlorine gas, accompanied by the diluting air or other aeriform component is then reacted with magnesium hydroxide ($Mg(OH)_2$), etc., preferably in water suspension with the formation of magnesium chloride ($MgCl_2$), together with magnesium hypochlorite ($MgClO$) and chlorate ($MgClO_3$). The solution of these magnesium salts is then reacted with sulphur dioxide ($SO_2$) which may be derived from the roasting of pyrites or from the burning of sulphur in air, the $SO_2$ reducing the magnesium hypochlorite and chlorate to form magnesium sulphate and magnesium chloride. The resulting solution of chloride and sulphate is then concentrated, and Epsom salt and hydrated magnesium chloride separated by fractional crystallization. The latter may then be dried by known methods and then used as feed to the cell.

It will be seen that the chlorine is cycled in the process, that magnesium is supplied in the form of the hydroxide, or other suitable base, and eliminated as the metal, and as Epsom salts, the sulphur for the Epsom salts being derived from the $SO_2$ introduced for reducing the hypochlorite and chlorate salts, or to produce with the chlorine, hydrochloric and sulphuric acids to react with the base supplied. The hypochlorite and chlorate are relatively small in amount, the output of Epsom salts being therefore small, relative to the output of magnesium chloride.

Instead of introducing the magnesium as magnesium hydroxide, it may be introduced, as already stated, in the form of calcined magnesia ($MgO$) which in water suspension will be the equivalent of magnesium hydroxide.

As an alternative procedure, the $SO_2$ may be introduced with the chlorine and magnesia base in the reactor as indicated by the broken line, under which conditions a solution of magnesium chloride and magnesium sulphate will result directly, as indicated by the broken line. Working in this manner hydrochloric acid and sulphuric acid will result from the interreaction of chlorine and $SO_2$ in the presence of water making possible the introduction of the magnesia in any form which will be soluble in these acids, such as magnesium carbonate, for instance.

Fig. 2 of the drawing indicates in more elaborate form the same cyclic process shown in Fig. 1, the drawing being diagrammatic and provisions being indicated for handling of minor process features.

In the electrolyzing of a $MgCl_2$ fused bath there may be formed in the bath a precipitate of a basic magnesia, generally referred to as magnesium oxide which it is necessary in practice to dip out of the bath. This magnesia sludge together with the magnesium chloride accompanying it may be added in the reactor along with the magnesium base entering the process.

It is not to be expected that all of the chlorine evolved from the electrolytic step can be fixed and conserved in the cyclic process, and thereby returned to the electrolytic step and provision is herein made for making up the deficit or loss which comprises adding a chloride which will react with magnesium sulphate, such as calcium chloride ($CaCl_2$) to the solution from the reactor or in the reactor itself in sufficient amount to furnish enough chlorine to make up for the loss. An equivalent amount of gypsum will be formed if calcium chloride is so used, which may be eliminated during the working up of the solution of magnesium chloride and sulphate.

Instead of making up chlorine losses by introducing the chlorine in combination as, for example, in the form of $CaCl_2$, it may be introduced into the reactor along with the cell chlorine. This method of fortifying the cell chlorine is in some respects preferable, since the formation of gypsum in the process is avoided thereby. If gaseous chlorine be available and used it may be introduced into the reactor, as in Figure 2, along with the cell chlorine in which case the introduction of calcium chloride would not be required.

The mother liquors and wash waters may be also cycled in the process as indicated to conserve the magnesium and chlorine content.

In certain methods of dehydrating magnesium chloride to obtain a product sufficiently dehydrated for use in the electrolytic step, decomposition occurs with the formation of hydrochloric acid (HCl). Provision is herein made to return the hydrochloric acid gas together with accompanying water from the drier to the reactor. This step also conserves the chlorine in the system and avoids necessity to otherwise dispose of the hydrochloric acid formed.

The legends on the diagrams are believed to be sufficient to enable a clear understanding of the process taken together with the description herein.

The principal source of magnesium chloride is at this time found in natural salt brines containing magnesium and calcium chlorides from which the magnesium chloride is separated, e. g., by fractional crystallization methods, usually in the form of $MgCl_2.6H_2O$, which hydrated form is then dried under such conditions as to produce a sufficiently dehydrated chloride for use in the production of metallic magnesium by electrolysis.

Our invention enables the economic production of magnesium metal in other localities than those in which a natural brine containing magnesium is found, in which localities power and fuel are not always available at a low price, or from a magnesium source other than natural brines, and thus enables the utilization of any strategic coincidence in occurrence of these essential factors in the production of magnesium metal.

Where in the claims the expression "adding thereto chlorine to compensate losses" is used, it shall be understood to refer to adding the chlorine as a gas or combined in a form which will react with the magnesium sulphate to form magnesium chloride and an insoluble sulphate.

Other modes of applying the principle of our invention may be employed instead of those explained, change being made as regards the means and steps herein disclosed, provided those stated by any of the following claims or their equivalent be employed.

We therefore particularly point out and distinctly claim as our invention:—

1. In a method of making magnesium chloride, the steps which consist in reacting chlorine and sulphur dioxide upon a suitable magnesium base in the presence of water to form chiefly magnesium chloride and magnesium sulphate, separating the magnesium chloride so formed, and electrolyzing the said chloride to produce magnesium metal and the chlorine to react with the magnesium base whereby the said chlorine is cycled in the process.

2. In a method of making magnesium chloride, the steps which consist in reacting chlorine and sulphur dioxide upon a suitable magnesium base in the presence of water to form chiefly magnesium chloride and magnesium sulphate, separating the magnesium chloride so formed, and electrolyzing the said chloride to produce magnesium metal and the chlorine to react with the magnesium base whereby the said chlorine is cycled in the process and adding thereto chlorine to compensate for losses.

3. In a method of making magnesium chloride, the steps which consist in reacting chlorine and sulphur dioxide upon a suitable magnesium base in the presence of water to form chiefly magnesium chloride and magnesium sulphate, separating the magnesium chloride so formed, drying it, and electrolyzing the said chloride to produce magnesium metal and the chlorine to react with the magnesium base whereby the said chlorine is cycled in the process.

4. In a method of making magnesium chloride, the steps which consist in reacting chlorine and sulphur dioxide upon a suitable magnesium base in the presence of water to form chiefly magnesium chloride and magnesium sulphate, separating the magnesium chloride so formed, drying it, and electrolyzing the said chlorine to produce magnesium metal and the chlorine to react with the magnesium base whereby the said chlorine is cycled in the process and adding thereto chlorine to compensate for losses.

5. In a method of making magnesium chloride, the steps which consist in reacting chlorine and sulphur dioxide upon a suitable magnesium base in the presence of water to form chiefly magnesium chloride and magnesium sulphate, adding calcium chloride to react with the magnesium sulphate, separating the magnesium chloride so formed, drying it, and electrolyzing the said chloride to produce magnesium metal and the chlorine to react with the magnesium base whereby the said chlorine is cycled in the process.

6. In a method of making magnesium chloride, the steps which consist in reacting chlorine and sulphur dioxide upon a suitable magnesium base in the presence of water to form chiefly magnesium chloride and magnesium sulphate, separating the magnesium chloride so formed, drying it, reacting hydrochloric acid evolved in the drying with said magnesium base, and electrolyzing the said chloride to produce magnesium metal and the chlorine to react with the magnesium base whereby the said chlorine is cycled in the process.

7. In a method of making magnesium chloride, the steps which consist in reacting chlorine with a suitable magnesium base in the presence of water to form a solution of magnesium chloride together with minor amounts of hypochlorite and chlorate, reducing said hypochlorite and chlorate by treating said solution with sulphur dioxide to produce a solution of magnesium chloride and magnesium sulphate, and separating the magnesium chloride from the magnesium sulphate.

8. In a method of making magnesium chloride, the steps which consist in reacting chlorine with a suitable magnesium base in the presence of water to form a solution of magnesium chloride together with minor amounts of hypochlorite and chlorate, reducing said hypochlorite and chlorate by treating said solution with sulphur dioxide to produce a solution of magnesium chloride and magnesium sulphate, separating the magnesium chloride from the magnesium sulphate and obtaining the chlorine for the first step by electrolyzing the magnesium chloride so obtained.

9. In a method of producing magnesium metal by the electrolysis of a fused bath of magnesium chloride whereby chlorine gas is also produced, the step which consists in combining the chlorine with a suitable magnesium base in the presence of water to form a solution of magnesium chloride, hypochlorite and chlorate, treating said solution with sulphur dioxide, separating magnesium chloride from the magnesium sulphate formed by said treatment, dehydrating the magnesium chloride so obtained and supplying it to the electrolysis step whereby the chlorine is cycled in the process.

10. In a method of producing magnesium metal by the electrolysis of a fused bath of magnesium chloride whereby chlorine gas is also produced, the step which consists in combining the chlorine with a suitable magnesium base in the presence of water to form a solution of magnesium chloride, hypochlorite and chlorate, treating said solution with sulphur dioxide, separating magnesium chloride from the magnesium sulphate formed by said treatment, dehydrating the magnesium chloride so obtained and supplying it to the electrolysis step whereby the chlorine is cycled in the process and adding thereto chlorine to compensate for losses.

Signed this 25th day of June, 1928.

THOMAS GRISWOLD, Jr.
RALPH M. HUNTER.